May 10, 1960 R. K. ORTHUBER ET AL 2,936,379

RADIATION-AMPLIFYING DEVICE

Filed Feb. 12, 1954 2 Sheets-Sheet 1

INVENTORS.
RICHARD K. ORTHUBER
LEE R. ULLERY
BY CHARLES V. STANLEY

Lockwood, Galt, Woodard, & Smith
ATTORNEYS

INVENTORS.
RICHARD K. ORTHUBER
LEE R. ULLERY
CHARLES V. STANLEY
BY Lockwood, Galt, Woodard, & Smith
ATTORNEYS United States Patent Office 2,936,379

Patented May 10, 1960

2,936,379

RADIATION-AMPLIFYING DEVICE

Richard K. Orthuber, Lee R. Ullery, and Charles V. Stanley, Fort Wayne, Ind., assignors to International Telephone and Telegraph Corporation Application February 12, 1954, Serial No. 409,982

18 Claims. (Cl. 250—213)

The present invention relates to a radiation-amplifying device, and more particularly to a solid state amplifier for reproducing, faithfully, a given radiation image.

In Orthuber continuation-in-part application Serial No. 332,733, filed January 22, 1953, and other applications of the assignee of this application, a display-amplifying device of the type contemplated by this invention is disclosed and claimed. This display-amplifying device was embodied in a laminated cell construction in which the laminae, for all practical purposes, were arranged in the manner of an ordinary parallel-plate condenser having a dielectric material interposed between the two plates. The plates of the condenser were composed of electrically conducting material, such as metal, in such thin films as to be transparent. The dielectric was comprised of two parts: viz, a lamina of photoconductive material, such as cadmium sulphide, having high dark electrical impedance and a contiguous lamina of electroluminescent material which may be excited to luminescence by the application thereto of a variable electric field. A typical suitable material for this electroluminescent lamina is a copper activated zinc oxide and zinc sulphide mixture as explained by Destriau in the 1937 edition, vol. 38, of Philosophical Magazine, on pages 700–739, 774–793, and 800–887. Other suitable materials are also described in these pages. Since the publication of this Destriau article, considerable developmental efforts have been expended in refining such electro-luminescent materials for such purposes as illuminating rooms much in the same manner as is accomplished by the conventional incandescent lamps. Materials used for lighting may be adapted to this invention in the light of the teaching of the above-mentioned applications and the present following disclosure.

With the application of an exciting alternating voltage to the two plates of the above-described display amplifier a voltage drop may be considered to exist therebetween which is the sum of the two voltage drops occurring across the respective two dielectric layers. By designing these dielectric layers in a predetermined manner, the electroluminescent material may be prevented from luminescing in the absence of exciting light, but, on the other hand, caused to luminesce when light energy is projected onto the photoconductive layer. During this latter condition, the electrical characteristics of the photoconductive layer are so changed as to alter the distribution of voltages across the two layers in a direction to increase the magnitude of the voltage applied to the electroluminescent layer. With this increase of voltage, the electroluminescent layer will emit light of such brightness as corresponds to the change in electrical characteristics of the photoconductive layer.

Such an amplifier cell has particular utility in the reproduction of television and motion picture displays. This cell provides amplification of the image projected upon it, whereby an image of low brightness content produced by a relatively small television picture tube may be magnified many times and reproduced in highly brightened condition for clear observation.

Reproduction characteristics of this amplifier are dependent in part upon the design of the various laminae. Thus, by varying certain structural features, corresponding variations of reproduction characteristics may be achieved.

This application constitutes an extension of one concept disclosed and claimed in Ullery application Serial No. 362,204, filed June 17, 1953.

In view of the foregoing, it is an object of this invention to provide a solid state radiation-amplifying device.

It is another object of this invention to provide a solid state radiation-amplifying device of such construction as will efficiently utilize incident radiation for reproduction purposes.

It is still another object of this invention to provide a solid state radiation-amplifying device in which the luminescing means is efficiently excited in discrete elemental areas for obtaining optimum brightness characteristics.

In accordance with the present invention, there is provided a radiation-amplifying device comprising a variety of elemental electrode areas which are electrically separated, said areas being composed of conductive material, first electrode means disposed to one side of these elemental areas, and a voltage control means connected between these elemental areas and this first electrode means. The voltage control means is characterized by having impedance characteristics which are dependent upon impinging radiation, such that the impedance between any selected elemental area and the first electrode means will be determined by such radiation. Second electrode means is disposed on the opposite side of the elemental electrode areas, and light-producing means is interposed between this second electrode means and the elemental areas. The light-producing means is operative to luminesce in discrete areas corresponding to the elemental electrode areas respectively and a variable electric field of predetermined magnitude is applied between these elemental areas and the second electrode means. Radiation-directing means for concentrating incident radiation onto predetermined portions of the voltage control means insures efficient utilization of such incident radiation for controlling the impedance of said voltage control means. By means of such impedance control, a variable electric field applied to the first and second electrode means can be efficiently controlled as it is applied to said light-producing means for causing the latter to luminesce.

For a better understanding of the invention, together with other and further objects thereof, reference is made to the following description, taken in connection with the accompanying drawings, and to the claims wherein the scope of invention is defined.

Figures 1, 2:
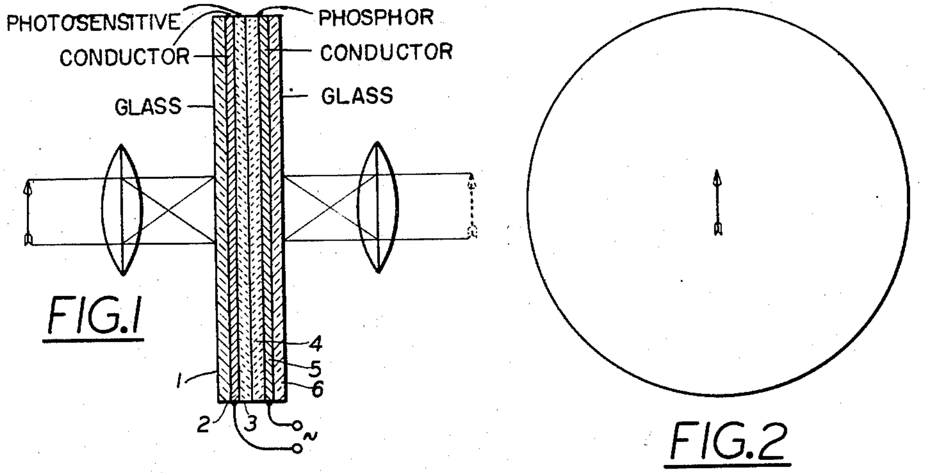
Fig. 1 is a cross-sectional view in diagrammatic form of the invention of the above-referred to Orthuber continuation-in-part application, which is useful in explaining the principles of this invention.
Fig. 2 is a front elevation thereof.

Referring to Fig. 1 of the drawings, the display amplifier of the above-referred to Orthuber continuation-in-part application is comprised of a laminated assembly of planar construction and is of suitable configuration such as the circular form shown in Fig. 2. The laminations of this assembly comprise a glass or the like supporting disc 1, a transparent film of conductive material 2, such as evaporated silver applied to one side of the disc 1, a layer 3 of photoconducting material (cadmium sulphide, for example), applied to the film 2, a lamina of electroluminescent material 4 mounted on the layer 3, another film 5 of conductive material which may be identical to the material of film 2, and a supporting glass disc 6 mounted contiguous the film 5. A light attenuating insulating lamina (not shown) may be interposed between the layers 4 and 5 for limiting light-feedback between the laminae 4 and 5.

Figure 9:
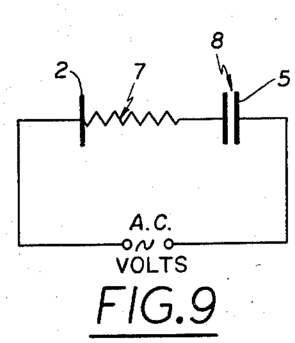
Fig. 9 is an equivalent circuit diagram used in explaining the operation of this invention.

The equivalent electrical circuit of this assembly is represented by Fig. 9. The resistor, generally indicated by the reference numeral 7, is comprised of the film electrode 2 and the photo-conductive material 3, and the condenser, generally indicated by the reference numeral 8, is comprised of electro-luminescent lamina 4 (the dielectric) and the film electrode 5. By application of an alternating exciting voltage of, for example, 600 volts at 800 cycles, across the two electrodes 2 and 5, a certain distribution of voltages or voltage division will occur across the two components 7 and 8, since they are connected in series. At first, if it is assumed that the components 7 and 8 are subjected to a condition of "no light" (in other words, placed in a completely darkened room) a certain voltage division will be obtained. Now, if it is assumed that the photoconductive material of the resistor 7 is illuminated, the impedance characteristics of this material will correspondingly change, thereby altering the division of voltages. Since such illumination tends to lower the impedance of the photoconductive material 3, an increase of voltage will be applied to the lamina 4. This lamina 4 (condenser 8) thereupon luminesces with a brightness dependent upon the magnitude of the alternating voltage applied thereto, so it becomes apparent that as the impedance of the component 7 decreases, the electroluminescent material 4 of the condenser 8 tends to luminesce.

It is important that the photoconductive layer 3 possesses a relatively low capacity when no light is projected thereon. Similarly, the dark-resistance of this layer 3 should be high. With the impedance properly designed, the division of voltages across the two components 7 and 8 would be such as to impose substantially all of the voltage across resistor 7 and a very small voltage across the condenser 8 during "no light" conditions. By assuring that this latter voltage is sufficiently small, the electroluminescent lamina 4 will not liminesce. Now, assuming the condition of projecting incident light on the layer 3 of progressively increasing brightness, the impedance across the layer 3 will correspondingly decrease thereby altering the division of voltages across the components 7 and 8 in a direction to increase the voltage across the electroluminescent material 4. When the threshold of luminescent sensitivity is reached, the lamina 4 will luminesce to a degree dependent upon the magnitude of the voltage impressed thereover.

Known methods of preparing a photoconductive surface comprised of, for example, evaporated cadmium sulphide, have been found not to be satisfactory for producing the layer 3 to a sufficient thickness for providing the necessary controlling impedances. The principal reason for this difficulty resides in the fact that such known methods provide photoconductive surfaces which tend to fall apart or separate from their substrates when made to sufficient thickness. In order to obtain proper voltage control, it is, however, necessary to provide sufficient thickness in order to reduce the admittance of the photoconductive layer, which if too high would lead to a light emission of the layer 4 even if layer 3 is not illuminated.

Figures 3, 4, 5, 6:
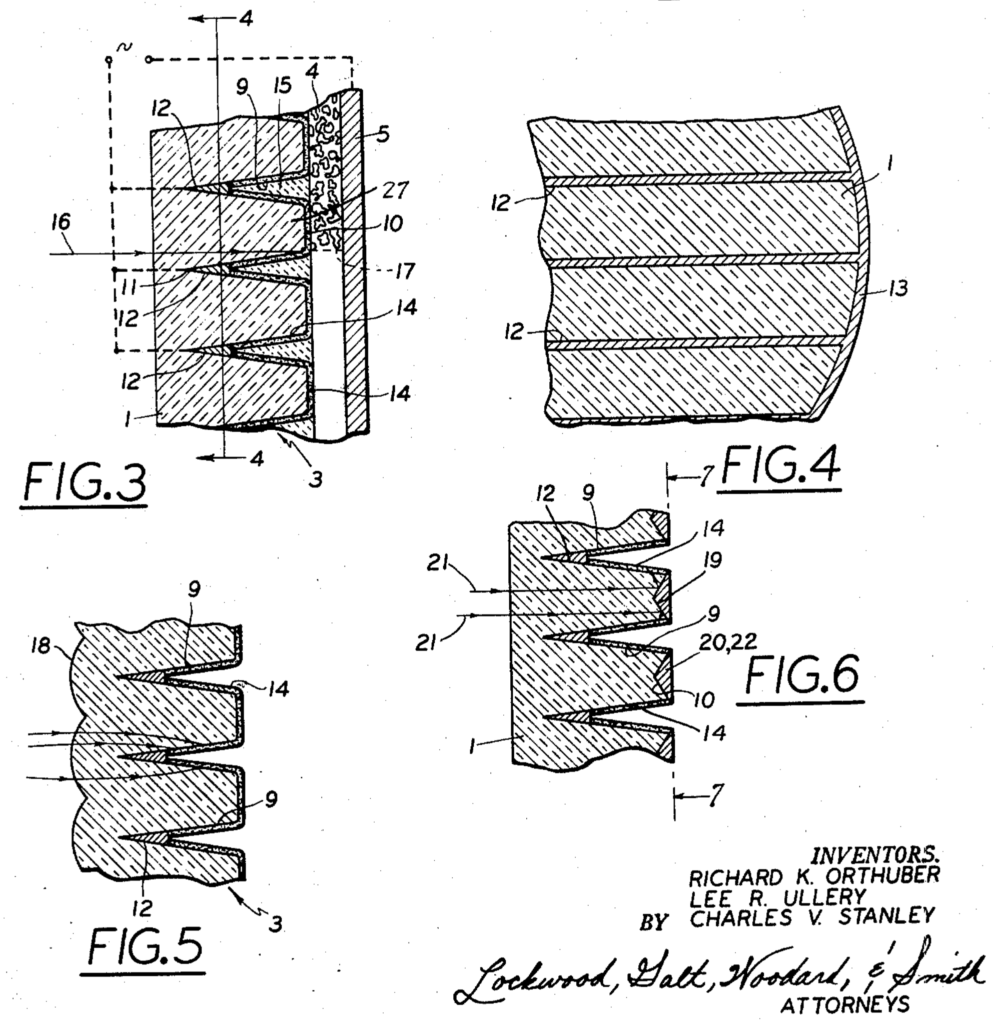
Fig. 3 is an enlarged fragmental cross-section of a particular embodiment.
Fig. 4 is an enlarged fragmental section taken substantially on section line 4—4 of Fig. 3.
Fig. 5 is an enlarged fragmental cross-section of another embodiment.
Fig. 6 is a similar cross-section view of still another embodiment.

Referring now in particular to Figs. 3 and 4, like numerals will indicate like parts. The reinforcing member or plate 1 preferably consists of a transparent flat plate having opposite parallel surfaces, one surface being marked or formed with a plurality of longitudinally extending equi-spaced, parallel V grooves 9 which define supporting ridges 27 having crests 10 and valley portions 11. As is clearly seen in Fig. 3, the width dimension of each ridge 10 substantially exceeds that of the groove 9, the reason for this dimension difference being explained more fully hereinafter.

The apices of the various grooves 11 are filled or coated with a conductive material such as platinum or silver so as to define electrode conductors indicated by the reference numeral 12. The other ends of these electrodes 12 are conductively connected together by a suitable bus bar (Fig. 4) 13 which preferably rims the perimeter of the support 1. In comparing this electrode structure of Figs. 3 and 4 with the diagrammatic illustration of Fig. 1, the conductive electrode assembly 12, 13 corresponds to the layer 2 of Fig. 1.

Upon the grooved surface of the supporting member 1 is deposited a thin film of photoconductive material which is indicated by the reference numeral 14. This material may be of any suitable, known photoconductive composition, and in the present instance is cadmium sulphide having a thickness which may range from between 2 to 20 microns. The thickness of the film is made such as to produce the desired operating characteristics of the finished amplifier as will be expained more fully in the following. The film may be evaporated onto the matrix according to any suitable method, one such method being given by R. P. Aitchison in Nature Magazine, vol. 167, page 812. Once the step of applying the film 14 has been completed, a conductive connection will have been made with the strip electrodes 12, thereby providing discrete electrically separated elements of photoconductive film 14 which extend between adjacent strip electrodes 12. Thus, excitation of one element 14 between adjacent strip electrodes 12 will have no effect on the conductivity characteristics of an element 14 between other adjacent electrodes 12. The importance of this will become apparent from the following description.

After completing the film 14, the remaining cavities in the grooves 9 are filled with an inert dielectric material 15, such as a hardenable wax. Preferably, this material is opaque to the transmission of light.

After filling the grooves with this plastic material 15, a layer of electroluminescent phosphor material is suitably applied to the exposed films of photoconductive material 14 on the crests 10, such application being by spraying or the like. Upon this layer of phosphor material 4 is then evaporated the film electrode 5 which essentially completes the construction of the light amplifier.

Alternatively, the phosphor material may be applied to one surface of a glass or the like reinforcing plate, such glass surface having previously been provided with a conductive, transparent coating of some material such as evaporated layers of silver, stannic chloride, etc. This phosphor surface is then pressed against the crests 10 and into conductive contact with the photoconductive film 14. Other methods of assembly will occur to persons skilled in the art.

In operation, a pin-point ray of light, indicated by the reference numeral 16, striking one portion of the film 14 within the extent of the groove 9, will serve to reduce the impedance of the film 14 at this point of impingement as measured between the adjacent strip electrode 12 and the adjacent surface of the phosphor 4. As explained earlier, this reduction in impedance serves to increase the voltage applied to the phosphor material 4 and to excite the latter, and since the photoconductive material 14 possesses fairly high resistance, this excitation of the phosphor material 4 will occur at a single point and will correspond to the cross-sectional size of the ray of light 16. With such a pin-point exciting ray 16, the phosphor would be excited in the vicinity of the reference numeral 17. It will now be apparent that the relatively long path between the individual strip electrodes 12 and the phosphor layer 4 provides a sufficiently high impedance in the photoconductive film 14 to prevent a sufficiently high voltage from being applied to the phosphor layer 4 to cause the latter to luminesce when the amplifier is subjected to "no light" conditions. However, upon applying incident radiation or the like to the groove film 14, such impedance is suitably controlled to increase the voltage applied to the respective areas of the phosphor material 4 causing the latter to luminesce.

By reason of the relatively wide dimension in the individual ridges 10, incident radiation which covers both the V-grooves and the adajcent ridges will serve to lower the impedance of the photoconductive film to make the latter conductive. These conductive portions being adjacent the phosphor layer 4, the latter will thereupon luminesce over an area corresponding to the more highly conducting areas of the film 14. It therefore becomes obvious, that all incident radiation is efficiently utilized in controlling the impedance characteristics of the photoconductive material 14, the only insensitive portions in the amplifier being those covered by the strip electrodes 12 which obviously constitute a very small fraction of the entire available sensitive film 14. In the remaining embodiments of this invention, various expedients have been employed to even more efficiently utilize incident, exciting radiation for increasing the brightness output of the amplifier.

In Fig. 5 is illustrated another embodiment of this invention in which like parts will again indicate like numerals. In this case, the left-hand surface upon which the incident radiation is projected is provided with a plurality of cylindrical lens portions 18 which are located in optical registry with the respective V-shaped grooves 9. Thus, incident radiation falling on any particular one of these lenses 18 will be converged onto the surfaces of groove 9 for exciting the film 14 thereon. By this means, the incident light is more effectively utilized for controlling the impedance of the film 14 extending between the individual electrodes 12 and the phosphor layer 4.

Of course, instead of using convexly curved lenses 18, concave surfaces in optical registry with the various grooves 9 may be employed, or other suitable light diffusing or concentrating surfaces may be desired for obtaining different control characteristics. It is within the scope of this invention to cover any light-directing means for providing a desired control characteristic of the photoconductive material 14.

In Fig. 6 is illustrated another embodiment of this invention which instead of utilizing lenses for directing incident radiation onto the coated surfaces of the grooves 9, uses reflective elements incorporated within a reinforcing member 1. These reflective surfaces are provided by shallow, longitudinally extending V-shaped grooves 19 which are filled with a conductive metallic substance such as silver to provide the elemental conductive areas or elements 20. Thus, a ray of light 21 entering the glass member 1 in between adjoining grooves 9 will be reflected from the impinged surface of the groove 19 to strike the film 14 on the V-surface 9. Thus, substantially all incident radiation projected onto the left surface of the supporting member 1 will be concentrated onto the control surfaces of the V-shaped grooves 9 again providing efficient utilization of incident radiation.

Figure 7:
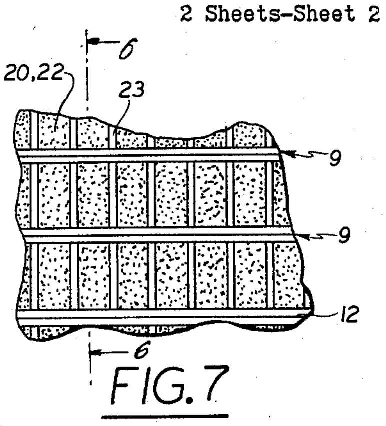
Fig. 7 is a fragmental elevational view of the embodiment of Fig. 6.

In the instances wherein metal is utilized on the crests of the ridges 10, it is necessary to provide this metal in discrete areas of suitable widths, such areas being electrically separated by electrically non-conductive or insulation material. Fig. 7 is an illustration of the arrangement of such elemental areas, the rectangles 22 being metallic elements against which the phosphor layer 4 is superimposed, and the strips 23 depicting areas of insulation therebetween. Thus, a pin-point ray of light which excites the photoconductive layer 14 directly beneath a metallic area 22 will serve to excite the phosphor material contacted only by this particular area 22. Were it not for the insulation areas 23 between elemental conductive areas 22, a complete line of illumination corresponding to the longitudinal extent of the ridge 10 would be produced. This result would obviously not be suitable for the production of a complex radiation image, whereupon individual discrete areas corresponding to a mosaic for exciting individual areas of the phosphor layer 4 must be provided.

Figure 8:
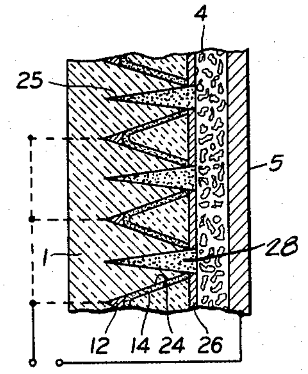
Fig. 8 is a fragmental section of still a further embodiment.

Another possible embodiment of this invention is illustrated in Fig. 8 wherein the member 1 is provided with alternate longitudinally extending grooves of unequal widths. The relatively wide grooves 24 are provided with the strip conductors 12 and the photoconducting material 14, whereas the adjacent relatively narrow grooves 25 are empty or filled only with insulation material 28. Small segments or films of metallic material 26 are bridged across the wide grooves 24 so as to contact the ends of the respective photoconductive film 14, these segments 26 corresponding to the elemental areas 22 of Fig. 7. The phosphor material 4 is deposited on the metallic elements 26.

Incident radiation striking the photoconductive material in the various grooves 24 will serve to control luminescing of the phosphor material which is in conductive contact with the respective metal segments 26. It will be appreciated that this particular embodiment provides a still further arrangement for obtaining more efficient utilization of incident light for controlling the impedance characteristics of the control film 14.

It will be readily understood that the groove 24 may conform to other geometric configurations such as a plurality of grooves or undulations disposed underneath the segments 26. The surfaces of these would be covered with the same photoconductive film.

In further consideration of the operating characteristics of the invention as exemplified by the various embodiments illustrated in the drawings, it is of importance to note that the excitation by incident radiation of one point or area of the photoconductive film 14 will not affect the dielectricity characteristics of the adjacent points or areas of the film. The reason for this, obviously, is that the film 14 is a semi-conductor which presents a relatively high impedance until it is acted upon by exciting radiation. This characteristic tends to restrict laterally the effect of incident light on the layer 3 to only that point which is illuminated, thereby reducing and eliminating the tendency of diffused or scattered excitation of the photoconductive material. Stated in other words, lateral conduction in the layer 3 is substantially suppressed. The practical result is that a pin-point of light incident on the left-hand side of the amplifier of Fig. 1 will appear as a pin-point of light on the right-hand side of the screen in substantially direct registry therewith. It will now be apparent that an image of complex design may be projected upon the left-hand face of the amplifier and be reproduced in faithful form on the observation side.

As will be apparent, the photosensitive lamina 3 of Fig. 1 is composed of the various films 14 of the embodiments of Figs. 3, 5, 6 and 7 which present, for a complete amplifier assembly, an irregular radiation-receiving surface. The irregularities of this surface are so arranged as to lie in the path of substantially the entire quantity of incident radiation or, in the alternative, in the path of reflected or refracted incident radiation. Thus, substantially all incident radiation is efficiently utilized for controlling the impedance characteristics of the photosensitive material.

In achieving the improved efficiency in operation, this invention serves to concentrate incident radiation upon the desired control areas of the photoconductive substance 3, 14 and a number of different methods of achieving this improved efficiency are disclosed and claimed hereinafter.

While there has been described what is at present considered the preferred embodiments of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A radiation amplifying device comprising a layer of electroluminescent phosphor material, planar electrodes on opposite sides of said layer, at least one of said electrodes lying in a given plane contiguous to the plane in which said electroluminescent layer lies and being separated into discrete elemental areas, radiation-sensitive elements having impedance characteristics which are dependent upon the character of radiation impinging thereon, each of said radiation sensitive elements coupled at one end thereof to a different one of said elemental areas and extending out of said given plane in a direction away from said electroluminescent layer and at an angle thereto, and means coupled to the opposite ends of each of said radiation-sensitive elements and also coupled to the other of said electrodes for applying an electric field to said electroluminescent layer.

2. A radiation amplifying device comprising a layer of electroluminescent phosphor material, a pair of electrodes each on opposite sides of said layer, at least one of said electrodes being separated into discrete elemental areas, a plurality of individual and separate radiation-sensitive elements having impedance characteristics which are dependent upon the character of radiation impinging thereon, each of said radiation-sensitive elements coupled at one end thereof to a different one of said elemental areas and means coupled to the opposite end of each of said radiation-sensitive elements and also coupled to the other of said electrodes for applying an electric field to said electroluminescent layer.

3. A radiation-amplifying device comprising a supporting member having a plurality of grooves, conductive material provided in the bottom portions of said grooves, photoconductive material in said grooves in electrical contact with said conductive material, a layer of electroluminescent phosphor material operatively associated with said conductive material, said photoconductive material providing an impedance between said conductive material and said phosphor layer, and electrode means for said phosphor layer, whereby an electric field may be applied to said photoconductive material and to said phosphor layer.

4. A radiation-amplifying device comprising a layer of electroluminescent phosphor material, voltage-controlling means operatively coupled to said phosphor layer and including ridges having surfaces of photoconductive material, conductive material on said ridges whereby said photoconductive material is electrically coupled between said phosphor layer and said conductive material, and means for applying an electrical field to said phosphor layer and said voltage-controlling means.

5. A radiation-amplifying device comprising a supporting member having a plurality of grooves, conductive elements in the bottoms of said grooves, photoconductive material in said grooves in electrical contact with said conductive elements, a layer of electroluminescent phosphor material fixed with respect to said supporting member, said photoconductive material being between said phosphor layer and said conductive elements, and means for applying an electric field to said phosphor layer and to said conductive elements.

6. A radiation-sensitive device comprising a sheet-like supporting member composed of transparent insulating material, at least one surface of said member being substantially flat, a plurality of parallel extending grooves in said one surface thereby dividing said surface into longitudinally extending ridges, conductors provided in the bottoms of said grooves, and a photoconductive material having impedance characteristics dependent upon incident radiation provided on the surfaces of said grooves and extending into electrical contact with the respective conductors.

7. A radiation-amplifying device comprising a supporting member having a plurality of longitudinal ridges spaced apart by valley portions, electrode conductors provided in the bottom of said valley portions, a film of photoconductive material provided on the surfaces of said valley portions extending into operative electrical contact with said electrode conductors, a layer of electroluminescent phosphor material applied to the crests of said ridges and having electrical contact with said film, and electrode means for applying an exciting potential across said phosphor material and said electrode conductors, said photoconductive and phosphor materials thereby being electrically coupled in series whereby incident radiation projected onto said photoconductive film will serve to alter the impedance thereof which serves to correspondingly alter the magnitude of the potential impressed across said phosphor layer.

8. A radiation-amplifying device comprising a supporting member having a plurality of longitudinal ridges spaced apart by valley portions, electrode conductors provided in the bottom of said valley portions, a film of photoconductive material provided on the surfaces of said valley portions extending into operative electrical contact with said electrode conductors, a layer of electroluminescent phosphor material applied to the crests of said ridges and having electrical contact with said film, electrode means for applying an exciting potential across said phosphor material and said electrode conductors, said photoconductive and phosphor materials thereby being electrically coupled in series whereby incident radiation projected onto said photoconductive film will serve to alter the impedance thereof which serves to correspondingly alter the magnitude of the potential impressed across said phosphor layer, and radiation-directing means operatively associated with said supporting member for concentrating incident radiation onto the film coated valley portions.

9. A radiation-amplifying device comprising a supporting member having a plurality of longitudinal ridges spaced apart by valley portions, electrode conductors provided in the bottom of said valley portions, a film of photoconductive material provided on the surfaces of said valley portions extending into operative electrical contact with said electrode conductors, a layer of electroluminescent phosphor material applied to the crests of said ridges and having electrical contact with said film, electrode means for applying an exciting potential across said phosphor material and said electrode conductors, said photoconductive and phosphor materials thereby being electrically coupled in series whereby incident radiation projected onto said photoconductive film will serve to alter the impedance thereof which serves to correspondingly alter the magnitude of the potential impressed across said phosphor layer, and radiation-directing means incorporated in said supporting member for directing incident radiation onto the film coated valley portions.

10. A radiation-sensitive device comprising a sheet-like supporting member composed of transparent insulating material, at least one surface of said member being substantially flat, a plurality of parallel extending grooves in said one surface thereby dividing said surface into longitudinally extending ridges, conductors provided in the bottoms of said grooves, a photoconductive material having impedance characteristics dependent upon incident radiation provided on the surfaces of said grooves and extending into electrical contact with the respective conductors, a radiation-directing means carried by said supporting member for concentrating incident radiation onto said groove surfaces for impinging the photoconductive material.

11. A radiation-amplifying device comprising a supporting member having a plurality of longitudinal ridges spaced apart by valley portions, electrode conductors provided in the bottom of said valley portions, a film of photoconductive material provided on the surfaces of said valley portions extending into operative electrical contact with said electrode conductors, a layer of electroluminescent phosphor material applied to the crests of said ridges and having electrical contact with said film, electrode means for applying an exciting potential across said phosphor material and said electrode conductors, said photoconductive and phosphor materials thereby being electrically coupled in series whereby incident radiation projected onto said photoconductive film will serve to alter the impedance thereof and in turn to alter the magnitude of the potential impressed across said phosphor layer, and radiation-directing means incorporated in said supporting member said radiation-directing means comprising a plurality of cylindrical lens elements in optical registration with said valley portions respectively whereby incident radiation falling on said lens elements will be directed toward the respective valley portions.

12. A radiation-sensitive device comprising a sheet-like supporting member composed of transparent insulating material, at least one surface of said member being subsantially flat, a plurality of parallel extending grooves in said one surface thereby dividing said surface into longitudinally extending ridges, conductors provided in the bottoms of said grooves, a photoconductive material having impedance characteristics dependent upon incident radiation provided on the surfaces of said grooves and extending into electrical contact with the respective conductors, a radiation-directing means carried by said supporting member for concentrating incident radiation onto said groove surfaces for impinging the photoconductive material, said radiation-directing means comprising a plurality of cylindrical lens elements in optical registration with said grooves respectively whereby incident radiation falling on said lens elements will be directed toward the respective groove for exciting the photoconductive material.

13. A radiation-amplifying device comprising a supporting member having a plurality of longitudinal ridges spaced apart by valley portions, electrode conductors provided in the bottom of said valley portions, a film of photoconductive material provided on the surfaces of said valley portions extending into operative electrical contact with said electrode conductors, a layer of electroluminescent phosphor material applied to the crests of said ridges and having electrical contact with said film, electrode means for applying an exciting potential across said phosphor material and said electrode conductors, said photoconductive and phosphor materials thereby being electrically coupled in series whereby incident radiation projected onto said photoconductive film will serve to alter the impedance thereof and in turn to alter the magnitude of the potential impressed across said phosphor layer, and radiation-directing means incorporated in said supporting member said radiation-directing means being constituted by reflective surfaces disposed in said ridges which serve to direct incident radiation toward the respective valley portions.

14. A radiation-sensitive device comprising a sheet-like supporting member composed of transparent insulating material, at least one surface of said member being substantially flat, a plurality of parallel extending grooves in said one surface thereby dividing said surface into longitudinally extending ridges, conductors provided in the bottoms of said grooves, a photoconductive material having impedance characteristics dependent upon incident radiation provided on the surfaces of said grooves and extending into electrical contact with the respective conductors, a radiation-directing means carried by said supporting member for concentrating incident radiation onto said groove surfaces for impinging the photoconductive material, said radiation-directing means comprising reflective surfaces incorporated in said ridges which serve to direct radiation incident on said supporting member toward said grooves respectively for exciting the photoconductive material.

15. A radiation-sensitive device comprising a sheet-like supporting member composed of transparent insulating material, at least one surface of said member being substantially flat, a plurality of parallel extending grooves in said one surface thereby dividing said surface into longitudinally extending ridges, conductors provided in the bottoms of said grooves, a photoconductive material having impedance characteristics dependent upon incident radiation provided on the surfaces of said grooves and extending into electrical contact with the respective conductors, a radiation-directing means carried by said supporting member for concentrating incident radiation onto said groove surfaces for impinging the photoconductive material, said radiation-directing means comprising V-grooves longitudinally formed in said ridges, said V-grooves being filled with light-reflective material whereby light incident on said V-grooves will be reflected toward the photoconductive material.

16. A radiation-amplifying device comprising a plurality of elemental electrode areas which are electrically separated, said areas being composed of conductive material, first electrode means, voltage control means connected between said elemental areas and said first electrode means, said voltage control means having impedance characteristics which are dependent upon the character of radiation impinging thereon whereby the impedance between any selected elemental area and said first electrode means will be determined by radiation falling onto the voltage control means, second electrode means, light-producing means interposed between said elemental areas and said second electrode means and operative to luminesce in discrete areas corresponding to said elemental areas respectively when an electric field of predetermined magnitude is applied between said elemental areas and said second electrode means, and radiation-directing means for concentrating radiation onto predetermined portions of said voltage control means, this last-mentioned radiation determining the division of a variable electric field between the voltage control means and the light-producing means, such electric field being coupled to said first and said second electrode means.

17. A radiation-amplifying device comprising a plurality of elemental electrode areas which are electrically separated, said areas being composed of conductive material, first electrode means, voltage control means connected between said elemental areas and said first electrode means, said voltage control means having impedance characteristics which are dependent upon the character of radiation impinging thereon whereby the impedance between any selected elemental area and said first electrode means will be determined by radiation falling onto the voltage control means, second electrode means, and light-producing means interposed between said elemental areas and said second electrode means and operative to luminesce in discrete areas corresponding to said elemental areas respectively when an electric field of predetermined magnitude is applied between said elemental areas and said second electrode means.

18. The device of claim 8 having an electrically conductive material which provides a conductive connection between said film and said phosphor layer.

References Cited in the file of this patent

UNITED STATES PATENTS

| | | |
|---|---|---|
| 2,495,697 | Chilwosky | Jan. 31, 1950 |
| 2,594,740 | DeForest et al. | Apr. 29, 1952 |
| 2,650,310 | White | Aug. 25, 1953 |
| 2,692,948 | Lion | Oct. 26, 1954 |
| 2,732,469 | Palmer | Jan. 24, 1956 |
| 2,768,310 | Kazan et al. | Oct. 23, 1956 |